Dec. 30, 1958 W. SUYDAM 2,866,628
OPEN HEARTH FURNACE
Filed Jan. 7, 1957 3 Sheets-Sheet 1

INVENTOR.
WALTER SUYDAM.
BY
ATTORNEYS.

United States Patent Office 2,866,628
Patented Dec. 30, 1958

2,866,628

OPEN HEARTH FURNACE

Walter Suydam, Mount Lebanon Township, Allegheny County, Pa., assignor to Loftus Engineering Corporation, Pittsburgh, Pa., a corporation of Maryland Application January 7, 1957, Serial No. 632,820

5 Claims. (Cl. 263—46)

My invention relates to basic open hearth furnaces for the production of steel, and consists in certain new and useful improvements in the structure of such furnaces.

An open hearth furnace consists essentially of a furnace chamber constructed or refractory masonry externally bound and reinforced by a frame-work of steel. The bottom of the furnace chamber comprises a dished refractory hearth or basin adapted to receive and contain a charge of steel scrap, molten pig iron, iron ore, limestone and other ingredients required to "work" the charge into a molten bath of steel of specified analysis. Ports open through the opposite ends of the furnace chamber, and in furnace operation combustion is sustained by fuel and air introduced through the firing port at one end of the chamber, while the products of combustion are removed through the outgo port at the other end of the chamber. Periodically the operation of the furnace is reversed; that is to say, the port which had been serving as the firing port becomes the outgo port, and the port which had been serving as the outgo port becomes the firing port. During such operation of the furnace, the charge is reduced to molten steel of desired analysis and at a suitable temperature for tapping from the furnace.

In the operation of the furnace there are periods in which chemical and thermal reactions create great turbulence in the molten metal and slag, such as occurs during the "ore boil" and the "lime boil," and this turbulence of the metal at temperatures upwards of 3,000° F., or higher, tends to erode and "cut" the refractory materials of which the hearth of the furnace is essentially formed.

In open hearth furnaces, as constructed ten or more years ago, the refractory material was of varied vertical thickness in different regions in the expanse of the hearth. In consequence, the rate of heat transfer through the refractory hearth to the external radiating surfaces of the steel body of the furnace varied at different points in the hearth, according as the thickness of the refractory material in the hearth varied, with the effect that the temperature in certain regions of the refractory body of the hearth was higher than in others. In the regions of higher temperature, other things being equal, the refractory materials of the hearth were more vulnerable to attrition and erosion under the effect of the active molten metal, and in these regions of greater vulnerability the molten metal tended to "cut" through the body of the hearth.

After each heat of steel was tapped from the furnace, the furnace hearth was repaired in the areas where it had been cut, an operation known as "making bottom." Sometimes the action of the turbulent molten metal on the hearth was so acute that the refractory material in a vulnerable spot was cut entirely through, thus exposing the hearth-supporting steel of the furnace to the molten metal. When this occurred the exposed steel quickly softened and broke through, allowing the bath of molten metal to runout of the furnace and spread over the floor of the shop or plant in which the furnace was located. A "run-out" of this sort was very dangerous to workmen, and the repair of the damage, the removal of the escaped metal, and the loss in furnace production were very costly.

The recent trend in the operation of open hearth furnaces is to blow or inject oxygen into the molten metal in the furnace for the purpose of accelerating the required reactions. Such use of oxygen increases the turbulence and the temperature of the bath of metal, with the effect that the furnace hearth becomes yet more susceptible to a break-through.

The ever present danger of breaks-through caused many furnace builders to increase the refractory materials in furnace hearths far beyond the depth otherwise required, but this did not provide the answer. In the course of time it was reasoned that by building refractory hearths thinner, but of relatively uniform thickness throughout, the thermal radiation, and in turn the temperature, at various points in the body of a hearth would tend to remain at approximately uniform and optimum value, wherefore the danger of molten steel cutting through the hearth would be reduced to a minimum. In line with this thinking several open hearth furnaces were built and successfully operated for several years.

In order to provide a refractory hearth of substantially uniform thickness and of desired heat-radiating potential, the refractory-supporting structural bed of the hearth was sloped upwardly from opposite sides of the center of the furnace to the "chills" between the port and hearth at each end of the furnace, and along the front and back walls of the furnace "chills" were provided. The effect of these details of construction was to give the structural steel bed of the hearth a concave form, upon which the refractory material was installed, to give a dished hearth of desired uniform thickness and contour.

A solution of the problem of how most effectively to design and construct the steel-work of such an "uniform hearth" furnace forms the object of this invention.

The invention will be understood upon reference to the accompanying drawings, in which.

Figure 1:
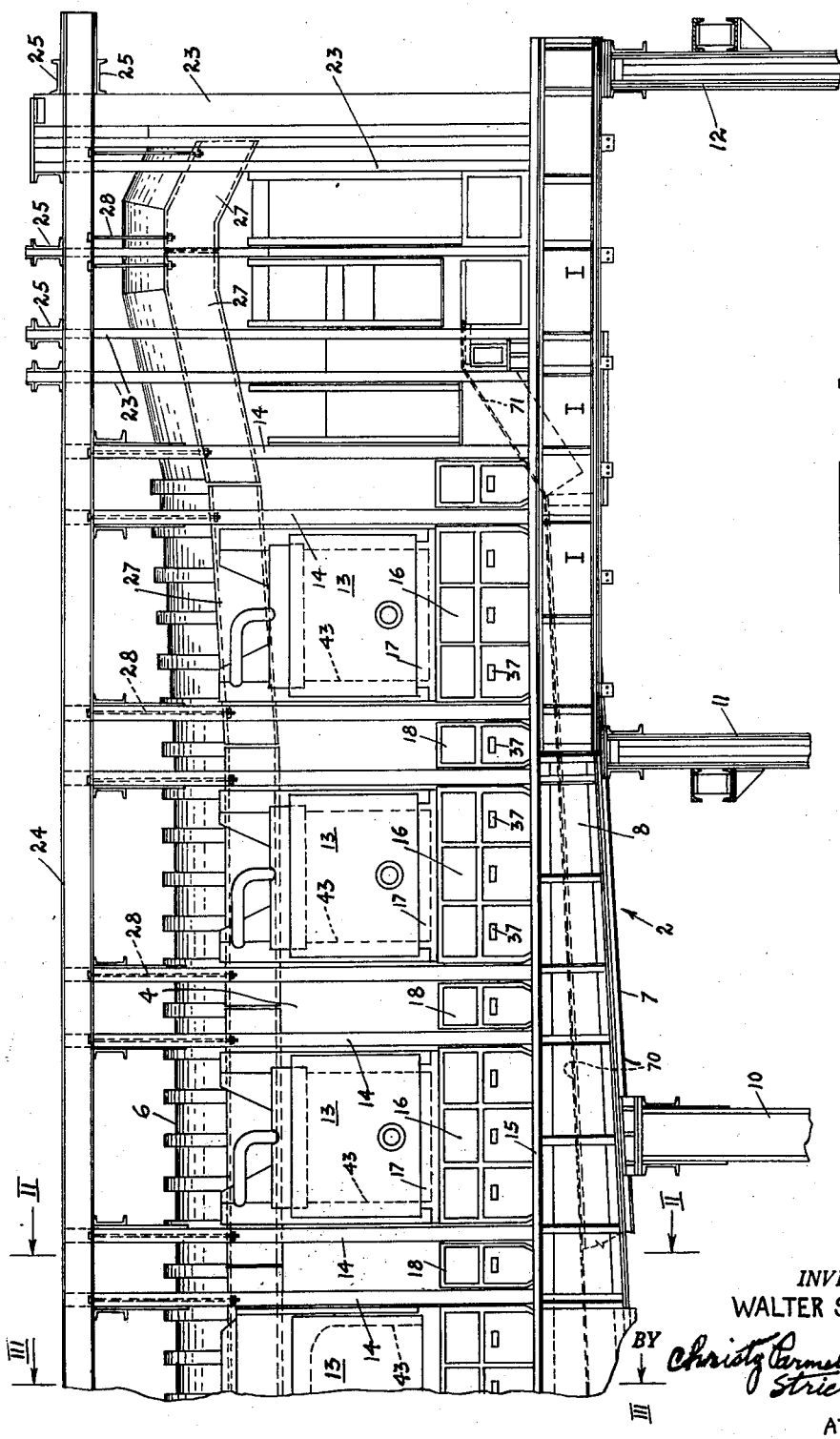
Fig. 1 is a fragmentary view in side elevation of an open hearth furnace that comprises an exemplary embodiment of the invention.
Figure 2:
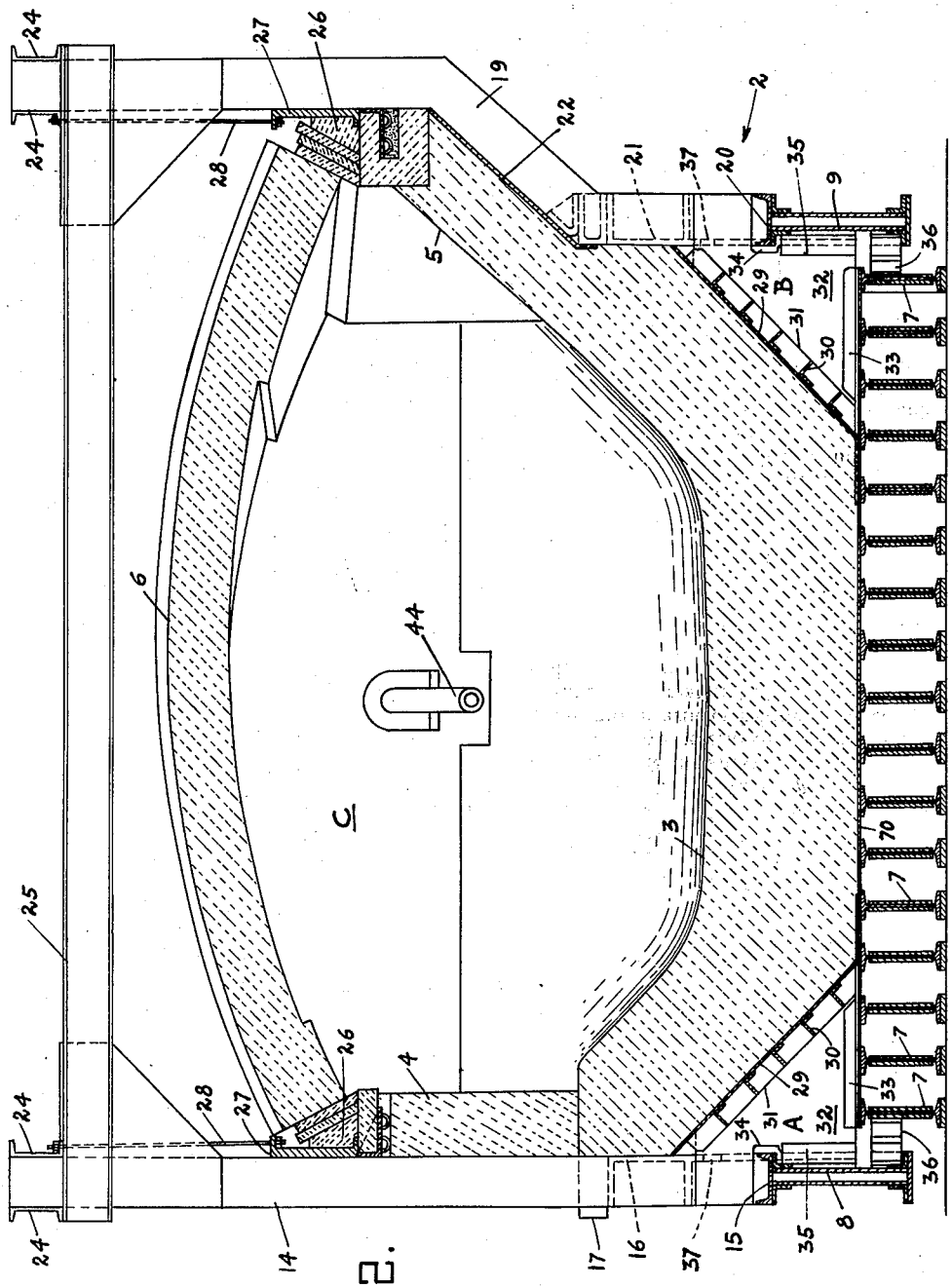
Fig. 2 is a view in cross section through the body of the furnace, the view being taken on the plane II—II of Fig. 1, and shown to larger scale.

In Fig. 1 of the drawings one-half of the body 2 of an open hearth furnace is shown in side elevation, and it will be understood that the other half of the furnace is identical with the half illustrated, but of opposite hand. Referring to Fig. 2, the body of the furnace comprises a hearth 3, a front wall 4, a sloping back wall 5 and a roof 6, all constructed of suitable refractory materials that are externally supported, bound, and reinforced, as will presently be described in greater detail.

In this case the roof is shown to be of sprung-arch construction, but if desired a flat or contoured suspended roof of known type may be used in lieu of the sprung-arch. The hearth of the furnace is supported upon a structural steel bed formed of beams 7 (Fig. 2) that extend longitudinally of the furnace, and carry a heavy steel plate 70, a so-called pan plate. This bed structure slopes upwardly from opposite sides of the center of the furnace to the usual chill 71 at each of the port ends of the furnace, as will be understood from the dotted line showing 7, 70 and 71 in Fig. 1. Longitudinal girders 8 and 9 extend along the front and back, respectively, of the structural steel bed 7, 70. These girders and the hearth beams 7 are supported by piers 10 and stanchions or buckstays 11 and 12. While only one pier 10 and one set of buckstays 11 and 12 are seen in Fig. 1, it will be understood that usually two piers and two sets of buckstays are provided, equi-spaced on opposite sides of the transverse center line of the furnace. The piers 10 are indicated in this case to be constructed of structural steel, but in many cases the piers will be constructed of reinforced concrete and provided with a protective facing of refractory brick. The stanchions 11 and 12 are normally formed of structural steel.

The furnace charge materials, placed on the hearth 3, are introduced through doorways 43 in the front wall of the furnace, said doorways being normally closed by doors 13.

The furnace is fired with fluid fuel (normally a liquid or gaseous fuel) and the firing of the furnace is normally continued during the charging procedure. The liquid or gaseous fuel for the furnace is jetted through a burner 44 (Fig. 2) in the port at one end (the firing end) of the furnace, while air, preheated in a regenerator located below the firing end of the furnace, flows through the usual slag pocket and rises through the port, to support the combustion of the fuel projected into the furnace chamber C. The hot products of combustion stream from the port at the other end (the outgo end) of the furnace, whence they flow into and through the associate slag pocket, regenerator and flue to the furnace stack. The hot products of combustion yield large stores of heat to the brickwork of the latter regenerator, whereby, when the furnace is reversed and the outgo port becomes the firing port, the heat so salvaged will be imparted to the combustion air. The operation of the furnace is periodically reversed and the regenerators associated with the two ends of the furnace serve alternately to heat the combustion air and to store heat received from the hot products of combustion. The detailed structure and function of the burners, slag pockets, regenerators, flues and stack, as well as the reversing valves and controls for effecting such operation of the furnace, are familiar to those skilled in the art, wherefore these elements and other elements of conventional open hearth construction have not been illustrated in the appended drawings and will not be further described herein.

At spaced-apart points along the front of the furnace vertical buckstays 14 of heavy steal are provided. These vertical buckstays are secured at their lower ends to a channel beam 15 that forms the top of girder 8. The front buckstays are spaced as shown in Fig. 1, to accommodate the furnace doors 13. Beneath the doorways cast steel breast plates 16 are secured and beneath each door these breast plates support a door sill or foreplate 17 of cast steel or iron. Spacer castings 18 are secured between the closely paired buckstays.

Along the back of the furnace spaced buckstays 19 are secured at their lower ends to a channel beam 20 that forms the top of the girder 9. Since the channel portions 15 and 20 of the girders 8 and 9 extend horizontally, the girders may be classified as horizontal structural members. Whereas the vertical buckstays 14 at the front of the furnace are straight, the buckstays 19 at the back of the furnace are of dog-leg shape, as shown in Fig. 2, and between the lower portions of the latter buckstays cast steel breast plates 21 are secured, while steel plate 22 spans the inclined portions of the buckstays to retain the refractory material in the backwall 5 above the breast plates.

The refractory walls of the port ends of the furnace are laterally supported by buckstays 23. The tops of the front, back and port-end buckstays are rigidly integrated by means of longitudinal and transverse steel beams 24 and 25. The springers or skew blocks 26 of the roof arch 6 are supported by steel skew channels 27, which are supported on vertical rods 28 and backed up by the buckstays along the front and back of the furnace.

It will be understood, therefore, that the refractory body of the furnace is supported and securely bound and reinforced by steel buckstays, plate and castings.

A chill extends longitudinally along the front and back walls of the furnace and throughout the length of the furnace hearth. These front and back chills are generally indicated in cross section at A and B in Fig. 2, wherein it will be seen that the chill structures each include a diaphragm 29. Usually the diaphragms are formed of heavy steel plate secured, as by riveting or welding, to the pan plate 70 of the structural steel hearth bed. From the plate 70 the longitudinally extending diaphragms 29, slope upwardly and outwardly to the plane of the inner faces of the buckstays and the breast plate castings of the front and back walls of the furnace. These inclined diaphragms 29 extend along the inside of the front and back of the furnace and are located above the structural hearth bed, 7, 70 (Fig. 2). The diaphragms 29 extend throughout the distance between the transverse chills 71 (Fig. 1), which are located at each end of the furnace chamber C. The structure provides a dished bed or support upon which refractory material may be applied to form a hearth 3 of the desired characteristics, as set forth in the introduction to this specification.

It is important to note that the diaphragms 29 are reinforced by riveted or welded longitudinal steel angles or webs 30 and transverse steel angles or webs 31. The particularly effective structure, by means of which the diaphragms 29 are reinforced and integrated in the furnace steelwork to provide an improved and more enduring furnace construction, forms an important feature of my invention.

The tops of the girders 8 and 9, on which the lower ends of the buckstays (14 and 19) are supported and secured, are located at a substantial interval above the pan plate 70. Gussets 32 of steel plate integrate the diaphragms 29 with the lower ends of the buckstays, with the girders 8 and 9, and with the pan plate portions that are extended outwardly from the lower edges of the diaphragms and lie beneath said diaphragms. Each vertical gusset has an inclined edge, a horizontal edge, and a vertical edge. The inclined edge of each gusset is rigidly united to its associate diaphragm 29, as by welding or riveting, say to one of the transverse reinforcing angle or web 31 united to the diaphragm. The horizontal bottom edge of each gusset is reinforced by a steel angle 33 and secured to the structural steel hearth bed of the furnace; that is, to the portion of the pan plate 70 extended outwardly from the lower edge of the adjacent diaphragm 29. Intermediate of its height, the vertical edge of each gusset 32 is recessed, as at 34, and above such recess the gusset plate is rigidly united to the lower portion the adjacent buckstay, while below the recess the gusset is rigidly fixed to the girder (8 or 9) that supports the buckstays. A heavy steel angle 35 reinforces the gusset and its attachment to the girder. It will be perceived, therefore, that the body of the gusset embraces, at 34, the region of union of the lower end of the buckstay with the channeled top of the girder, and, since the gusset is rigidly united to the buckstay above and to the body of the girder below the region of embracement, an extremely sturdy and durable integration of the structure is obtained.

At each of the buckstays 14 and 19 along the front and back of the furnace a gusset is installed in the manner described, and a greatly improved open hearth furnace structure is realized. To the end that still greatly rigidity of the structure may be obtained, particularly in large furnaces, a bracing element 36 of steel plate and angles integrates the lower body portion of the girder beneath each gusset 32 with the adjacent beam 7 of the steel hearth bed.

Another feature is found in the provision of vents 37 in the breast plate and spacer plate castings 16, 17 and 21. These vents are spaced at intervals along the front and back walls of the furnace and provide for a circulation of atmospheric air beneath the diaphragms 29. This air circulation affords a beneficial cooling effect beneath the refractory hearth along the front and back walls of the furnace. Entrance of outer atmospheric air to the spaces between the gussets 32 and beneath the diaphragms 29 is had through the spaces between the lower edges of the girders (8 and 9) and the edges of the pan plate 70, and, under the effect of furnace heat conducted through and radiated by the furnace hearth, a beneficial circulation of air through the openings or vents 37 is promoted.

Figure 3:
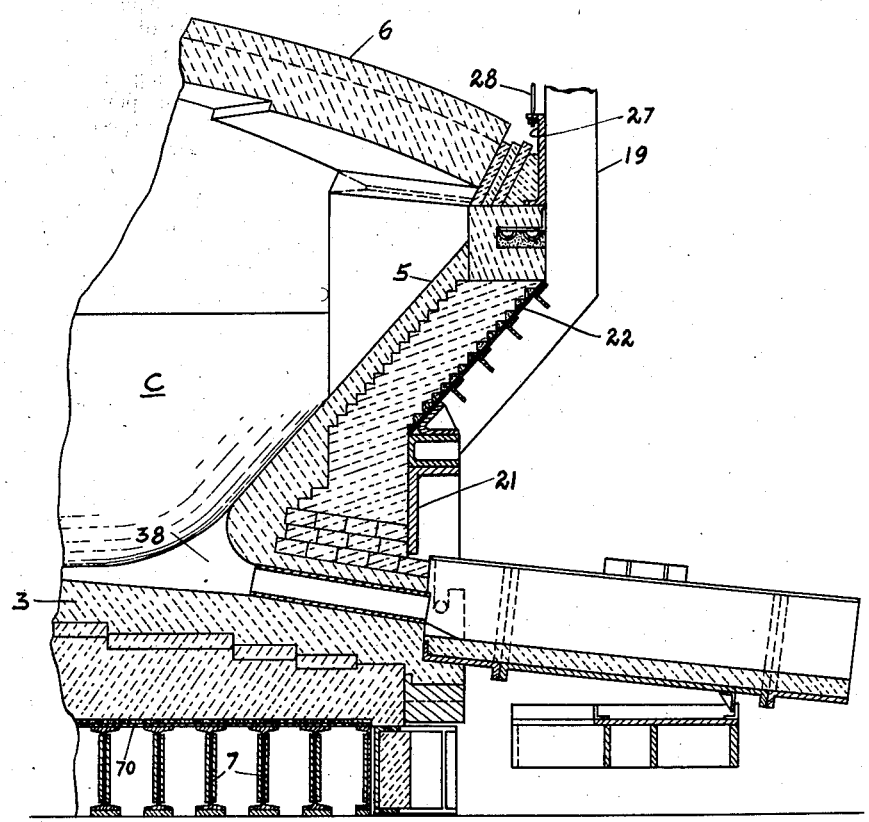
Fig. 3 is a fragmentary view in cross section through the body of the furnace at the tap-hole, as seen on the plane III—III of Fig. 1, and on the scale of Fig. 2.

In Fig. 3 is shown a fragmentary cross-sectional view of the furnace on its transverse center line. This center line is where the usual tap-hole 38 is provided in the furnace hearth for the removal of the molten steel produced in the furnace. It is needless for an understanding of my present invention to describe the furnace structure at the tap-hole, other than to say that the girder 9 and the chill B are at this point interrupted in their otherwise continuous extents along the furnace back wall. The manner in which the steelwork of an open hearth furnace may be interrupted at the tap-hole will be understood upon reference to United States Letters Patent 2,676,011, granted April 20, 1954, to Fred H. Loftus et al.

By virtue of the improvements described a furnace of desired hearth characteristics is realized. Also, the furnace structure is of greater mechanical strength and durability than furnaces as constructed hitherto, and advantageously the sloping of the hearth bed upwardly toward the port ends of the furnace permits the port passages to extend to a higher elevation then they otherwise could.

In considering the appended claims it will be understood that many modifications and variations may be made in the structure described without departing from the essence of the invention.

I claim:

1. In an open hearth furnace having a refractory hearth of substantially uniform thickness borne upon a structural steel bed, a refractory roof and front, back and port walls defining with said hearth a furnace chamber, horizontal steel girders extending along the front and the back of said steel bed, buckstays extending upwardly from said girders at longitudinally spaced-apart points along said front and back walls, longitudinal and transverse steel members integrating the upper ends of said buckstays, and chills extending longitudinally of the front and back walls of the furnace; the invention herein described wherein each longitudinally extending chill comprises a steel diaphragm united to and inclined upwardly and outwardly from said structural steel bed to the buckstays of the adjacent furnace wall; vertical gussets having inclined upper edges secured to said diaphragm, and vertical edges secured to said buckstays severally; and a plurality of bracing elements effective below the lower ends of the buckstays for integrating the body of said girders to the structural steel bed of said hearth.

2. In an open hearth furnace having a refractory hearth of substantially uniform thickness borne upon a structural steel bed, a refractory roof and front, back and port walls defining with said hearth a furnace chamber, horizontal steel girders extending along the front and the back of said steel bed, buckstays extending upwardly from said girders at longitudinally spaced-apart points along said front and back walls, longitudinal and transverse steel members integrating the upper ends of said buckstays, and chills extending longitudinally of the front and back walls of the furnace; the invention herein described wherein each longitudinally extending chill comprises a steel diaphragm united to and inclined upwardly and outwardly from said structural steel bed to the buckstays of the adjacent furnace wall; vertical gussets having inclined upper edges secured to said diaphragm, and vertical outer edges secured to said buckstays severally, with said vertical edges of the gussets extended below the lower ends of the buckstays and secured to said girders, whereby the bodies of the gussets structurally bridge and reinforce the assembly at the points where the lower ends of the buckstays are engaged to the girder.

3. In an open hearth furnace having a refractory hearth of substantially uniform thickness supported upon a structural steel bed comprised of a steel pan plate borne on steel beams, a refractory roof and front, back and port walls defining with said hearth a furnace chamber, horizontal steel girders extending along the front and the back of said steel bed, buckstays extending upwardly from said girders at longitudinally spaced-apart points along said front and back walls, longitudinal and transverse steel members integrating the upper ends of said buckstays, and chills extending longitudinally of the front and back walls of the furnace; the invention herein described wherein each longitudinally extending chill comprises a steel diaphragm united to said pan plate along a line located at a substantial interval inwardly from the adjacent edge of the pan plate, said steel diaphragm being inclined upwardly and outwardly from said line to the buckstays of the adjacent furnace wall; vertical gussets having inclined upper edges secured to said diaphragm, and vertical edges secured to said buckstays severally, and horizontal bottom edges secured to the portion of the pan plate extending outwardly from said line, and a plurality of bracing elements effective below the lower ends of said buckstays for integrating the body of said girders to the structural steel bed of said hearth.

4. In an open hearth furnace having a refractory hearth of substantially uniform thickness supported upon a structural steel bed comprised of a steel pan plate borne on steel beams, a refractory roof and front, back and port walls defining with said hearth a furnace chamber, horizontal steel girders extending along the front and the back of said steel bed, buckstays extending upwardly from said girders at longitudinally spaced-apart points along said front and back walls, longitudinal and transverse steel members integrating the upper ends of said buckstays, and chills extending longitudinally of the front and back walls of the furnaces; the invention herein described wherein each longitudinally extending chill comprises a steel diaphragm united to said pan plate along a line located at a substantial interval inwardly from the adjacent edge of the pan plate, said steel diaphragm being inclined upwardly and outwardly from said line to the buckstays of the adjacent furnace wall; vertical gussets having inclined upper edges secured to said diaphragm, and vertical edges secured to said buckstays severally, and horizontal bottom edges secured to the portion of the pan plate extending outwardly from said line, said vertical edges of the gussets being extended below the lower ends of the buckstays and secured to said girders, whereby the bodies of the gussets structurally bridge and reinforce the assembly at the points where the lower ends of the buckstays are engaged to the girder.

5. In an open hearth furnace having a refractory hearth of substantially uniform thickness supported upon a structural steel bed comprised of a steel pan plate borne on steel beams, a refractory roof and front, back and port walls defining with said hearth a furnace chamber, horizontal steel girders extending along the front and the back of said steel bed, buckstays extending upwardly from said girders at longitudinally spaced-apart points along said front and back walls, longitudinal and transverse steel members integrating the upper ends of said buckstays, and chills extending longitudinally of the front and back walls of the furnaces; the invention herein described wherein each longitudinally extending chill comprises a steel diaphragm united to said pan plate along a line located at a substantial interval inwardly from the adjacent edge of the pan plate, said steel diaphragm being inclined upwardly and outwardly from said line to the buckstays of the adjacent furnace wall; vertical gussets having inclined upper edges secured to said diaphragm, and vertical edges secured to said buckstays severally, and horizontal edges secured to the portion of the pan plate extending outwardly from said line, said vertical edges of the gussets being extended below the lower ends of the buckstays and secured to said girders, whereby the bodies of the gussets structurally bridge and reinforce the assembly at the points where the lower ends of the buckstays are engaged to the girder, together with a plurality of bracing elements effective below the lower ends of the buckstays for integrating the body of the girder to the structural steel bed of said hearth.

References Cited in the file of this patent

UNITED STATES PATENTS

| | | |
|---|---|---|
| 2,217,384 | Rodenbaugh | Oct. 8, 1940 |
| 2,771,285 | Heuer | Nov. 20, 1956 |
| 2,773,682 | Barkley | Dec. 11, 1956 |